United States Patent [19]

Higashi

[11] Patent Number: 4,956,761
[45] Date of Patent: Sep. 11, 1990

[54] SWITCHING POWER SOURCE APPARATUS OF RINGING CHOKE CONVERTER SYSTEM

[75] Inventor: Shinya Higashi, Tokyo, Japan

[73] Assignee: Kabushiki Kaisha Toshiba, Kawasaki, Japan

[21] Appl. No.: 160,322

[22] Filed: Feb. 25, 1988

[30] Foreign Application Priority Data

Feb. 27, 1987 [JP] Japan .................. 62-28214[U]

[51] Int. Cl.$^5$ .................................. H02M 3/338
[52] U.S. Cl. .................................. 363/19; 363/21; 363/97; 323/222
[58] Field of Search .................... 363/18, 19, 20, 21, 363/95, 96, 97, 121; 323/222

[56] References Cited

U.S. PATENT DOCUMENTS

| | | | |
|---|---|---|---|
| 4,263,643 | 4/1981 | Koike | 363/19 |
| 4,272,805 | 6/1981 | Iguchi et al. | 363/19 |
| 4,283,759 | 8/1981 | Koike | 363/19 |
| 4,327,404 | 4/1982 | Horiguchi | 363/19 |
| 4,355,277 | 10/1982 | Davis et al. | 363/21 X |
| 4,387,418 | 6/1983 | Koike | 363/19 |
| 4,573,112 | 2/1986 | Numata et al. | 363/19 |
| 4,654,771 | 3/1987 | Stasch et al. | 363/19 |
| 4,700,280 | 10/1987 | Onda et al. | 363/19 |
| 4,758,937 | 7/1988 | Usui et al. | 363/19 |
| 4,763,235 | 8/1988 | Morita | 363/19 |
| 4,763,236 | 8/1988 | Usui | 363/19 |

Primary Examiner—William H. Beha, Jr.
Assistant Examiner—Emanual Todd Voeltz
Attorney, Agent, or Firm—Finnegan, Henderson, Farabow, Garrett, and Dunner

[57] ABSTRACT

A switching power source apparatus of a ringing choke converter system according to the present invention includes an amplifier for outputting a voltatge to be decreased with an increase in output voltage from a switching power source apparatus, an oscillator for generating a sawtooth wave voltage, a comparator for comparing the sawtooth wave voltage output from the oscillator with the detection output voltage from the amplifier, a first control transistor for controlling the oscillator, and a second control transistor for controlling the switching transistor. When the sawtooth wave voltage is lower than the detection output voltage, the first control transistor is turned on, and the oscillator is subsequently turned on. When the sawtooth wave voltage is higher than the detection output voltage, the second control transistor is turned on, and the switching transistor is subsequently turned on. As a result, the switching frequency is set constant by decreasing the duty ratio in the small load period.

2 Claims, 4 Drawing Sheets

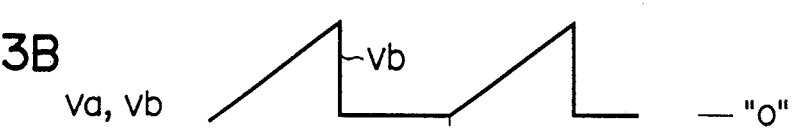
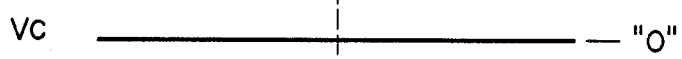
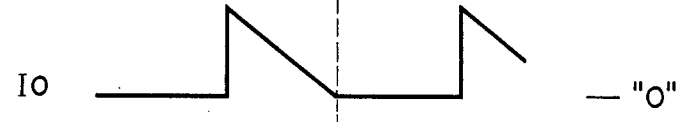
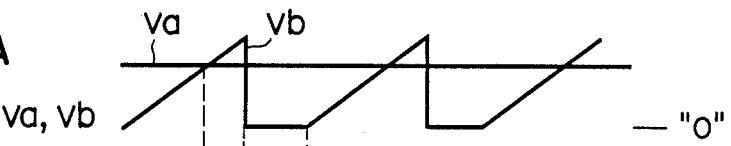
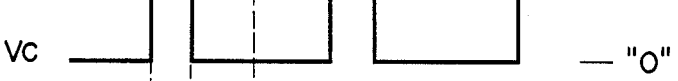

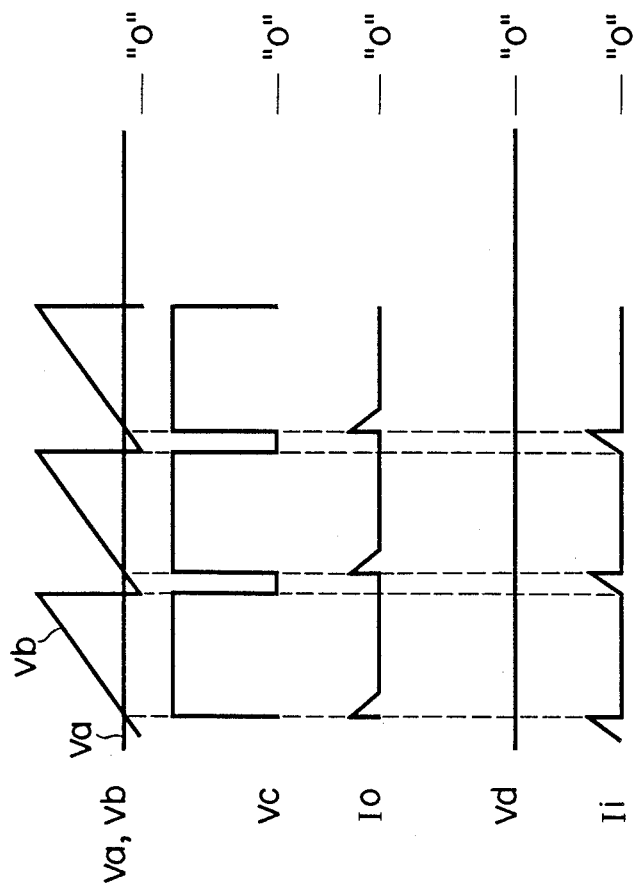

SWITCHING POWER SOURCE APPARATUS OF RINGING CHOKE CONVERTER SYSTEM

BACKGROUND OF THE INVENTION

The present invention relates to a system for controlling a switching frequency in a switching power source apparatus of a ringing choke converter system.

Generally, a switching power source apparatus of a ringing choke converter system includes a switching transistor. Self-excitation is caused by repeatedly turning on and off this transistor. Upon self-excitation, a current having a sawtooth wave is generated at the output of the switching transistor. The current is smoothed by a capacitor, and continuously supplied to a load as a DC current. In this case, when the switching frequency of the switching transistor is kept constant, an output voltage varies depending on the magnitude of a load to be connected. More specifically, when the load is small, the output voltage from the power source apparatus becomes higher than a reference voltage, whereas when it is large, the output voltage becomes lower than the reference voltage. For this reason, the switching transistor is controlled such that when the load is small, the switching frequency is kept high, and when it is large, the switching frequency is kept low.

In conventional systems, the frequency can be controlled to be set at a low level. However, problems have been posed in control for setting the frequency at a high level. More specifically, since the maximum frequency is solely determined by the characteristics of a switching transistor, control for setting the output voltage from the power source to be constant by increasing the switching frequency of the switching transistor is greatly limited. For this reason, in the conventional systems, a dummy resistor is connected in parallel to the output terminal of the power source apparatus so as to increase the magnitude of the load Output dummy resistor loss P is represented by the following equation.

$$\text{Output dummy resistor loss } P = (Vi^2 \times Ton^2)/(2 \times L \times T) \quad (1)$$

where
Vi: input voltage
L: primary inductance of transformer
T: switching frequency
Ton: minimum ON time of switching transistor In the conventional systems, the ratio of the ON time to the OFF time (duty ratio) of a transistor is 1:1. Therefore, as is apparent from equation (1), if frequency T is raised, output dummy resistor loss P is increased, resulting in a decrease in output voltage. When the output energy is, e.g., 5 W, a 2.5-W resistor is used as such an output dummy resistor. As a result, efficiency of the power source is degraded. In addition, a cooling fan is required because heat is generated due to the dummy resistor loss.

SUMMARY OF THE INVENTION

It is an object of the present invention to provide a switching power source apparatus which can set a switching frequency of a main switching transistor to be constant regardless of characteristics of the main switching transistor, thereby decreasing a dummy loss due to an output dummy resistor.

In order to achieve the above object, a switching power source apparatus of a ringing choke converter system comprises a switching transistor, small load detecting means for detecting that a load connected to an output of the switching power source apparatus is small and outputting a detection signal, and means, connected to the small load detecting means and the switching transistor, for decreasing a duty ratio of the switching transistor in response to the detection signal from the small load detecting means.

According to the switching power source apparatus of the present invention, when an output voltage is increased in the small load period, the output voltage is controlled by decreasing the duty ratio of the switching transistor without changing the switching frequency. Therefore, an increase in switching loss due to a high frequency can be prevented. In addition, since switching frequency T can be arbitrarily set regardless of characteristics of a switching transistor, T can be set at a large value with respect to minimum ON time Ton ($Ton^2/T$ is set small). As a result, the output dummy resistor loss can be minimized. Consequently, a cooling fan or the like is not required, resulting in a decrease in cost. Furthermore, since the switching frequency is constant, an input interference terminal voltage control circuit can be standardized.

BRIEF DESCRIPTION OF THE DRAWINGS

Other objects and features of the present invention will be apparent from the following description taken in connection with the accompanying drawings, in which:

FIGS. 3A through 3F are timing charts of the switching power source apparatus in FIG. 1 when a load is large or the apparatus is energized, in which FIG. 3A shows output voltage Va from amplifier AMP2, FIG. 3B shows output voltage Vb from oscillator OSC, FIG. 3C shows emitter voltage Vc from transistor Q5, FIG. 3D shows secondary current Io, FIG. 3E shows base voltage Vd from transistor Q3, and FIG. 3F shows primary current Ii of transformer M; and FIGS. 4A through 4E and FIGS. 5A through 5E are timing charts of the switching power source apparatus in FIG. 1 when a load is set at a normal value and at a small value, in which FIG. 4A and 5A show output voltages Va and Vb from amplifier AMP2 and oscillator OSC, respectively, FIGS. 4B and 5B show emitter voltages Vc from transistor Q5, FIGS. 4C and 5C show secondary currents Io, FIGS. 4D and 5D show base voltages Vd of transistor Q3, and FIGS. 4E and 5E show primary currents Ii of transformer M.

DETAILED DESCRIPTION OF THE PREFERRED EMBODIMENT

Figure 1:
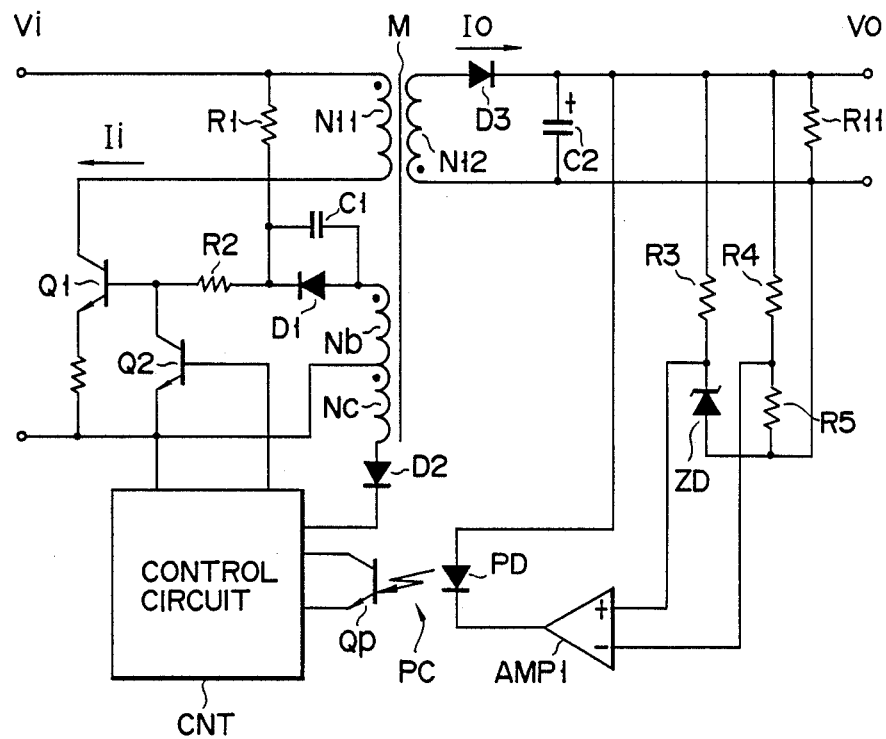
FIG. 1 s a block diagram of a switching power source apparatus according to an embodiment of the present invention.

FIG. 1 is a circuit diagram of a switching power source apparatus according to an embodiment of the present invention. The switching power source apparatus in FIG. 1 comprises flyback transformer M and main switching transistor Q1. The collector of transistor Q1 is connected to one terminal of primary winding N11 of transformer M. A series circuit of resistors R1 and R2 is inserted between the other terminal of primary winding N11 and the base of transistor Q1. Resistor R1 functions as a trigger resistor for energizing transistor Q1 upon the energizing of the apparatus. Resistor R2 serves to limit a base current of transistor Q1. One terminal of a parallel circuit of diode D1 and capacitor C1 is connected to a common node of resistors R1 and R2. One terminal of base winding Nb, which is one of the primary windings of transformer M, is connected to the other terminal of the parallel circuit. The other terminal of base winding Nb is connected to control winding Nc, which is one of the primary windings of transformer M, and to the emitter of control transistor Q2 for turning off transistor Q1. The other terminal of control winding Nc is connected to the anode of diode D2, and the collector of transistor Q2 is connected to the base of transistor Q1.

One terminal of secondary winding N12 of transformer M is connected to the anode of diode D3. Capacitor C2 for smoothing outputs is inserted between the cathode of diode D3 and the other terminal of secondary winding N12. A series circuit of resistor R3 and Zener diode ZD, and a series circuit of resistors R4 and R5 are connected in parallel to capacitor C2. A voltage smoothed by capacitor C2, i.e., output voltage Vo is applied to these series circuits. The anode of photodiode PD constituting part of photocoupler PC is connected to the positive voltage terminal of capacitor C2. The output terminal of amplifier AMP1 is connected to the cathode of photodiode PD. Amplifier AMP1 serves to output a voltage corresponding to the difference between the potential at a common node of resistor R3 and Zener diode ZD, and that at a common node of resistors R4 and R5. The collector and base of phototransistor Qp, which constitutes photocoupler PC together with photodiode PD, are connected to control circuit CNT for stabilizing output voltage Vo. The base and emitter of transistor Q2, and the cathode of diode D2 are connected to control circuit CNT. In addition, output dummy resistor R11 is connected to the output terminal of the switching power source apparatus.

Figure 2:
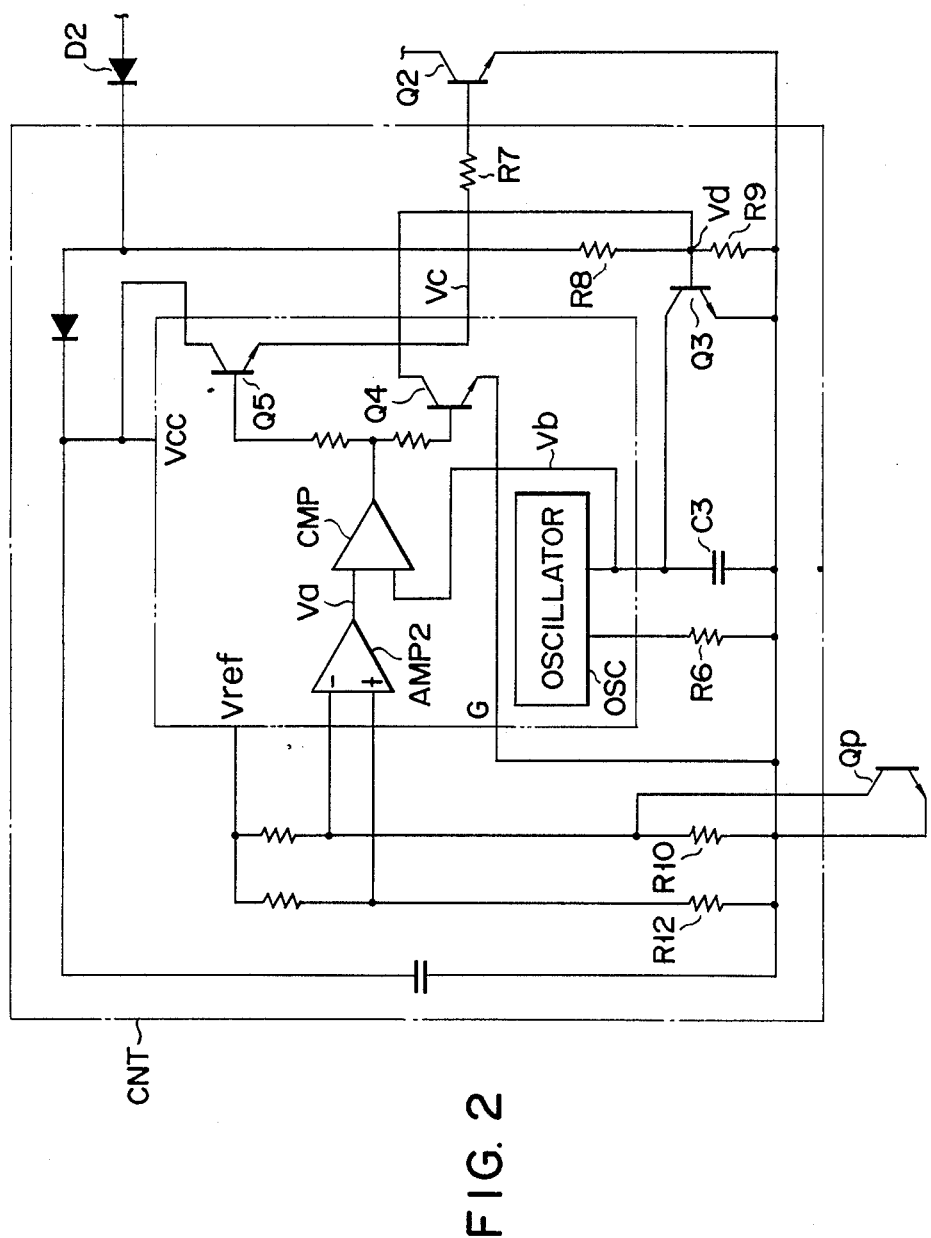
FIG. 2 is a block diagram showing a control circuit in FIG. 1 in detail.

FIG. 2 is a circuit diagram showing the control circuit CNT in FIG. 1 in detail. Referring to FIG. 2, oscillator OSC generates sawtooth wave voltage Vb having a time constant determined by resistor R6 and capacitor C3. Amplifier AMP2 amplifies a voltage applied to the collector of phototransistor Qp, i.e., the difference between a voltage across resistor R10 and that across resistor R12. Amplifier AMP2 is designed such that when output voltage Vo is increased, output voltage Va is decreased. Comparator CMP compares the magnitudes of output voltages Va and Vb respectively output from amplifier AMP2 and oscillator OSC, and detects Va<Vb. Control transistor Q3 is in the ON state for a period when base voltage Vd is set at a high level so as to delay the charge start time of capacitor C3. Control transistor Q4 turns off transistor Q3 in response to a high-level output signal from comparator CMP. Control transistor Q5 generates emitter voltage Vc in response to the high-level output signal from comparator CMP. Voltage Vc is applied to the base of transistor Q2 through resistor R7. The emitters of transistors Q2 and Q3 are connected to each other. A series circuit of resistors R8 and R9 is inserted between the emitter of transistor Q3 and the cathode of diode D2. A common node of resistors R8 and R9 is connected to the collector of transistor Q4.

An operation of the switching power source apparatus in FIGS. 1 and 2 will be described below with reference to FIGS. 3A through 3F, 4A through 4E, and 5A through 5E. Referring to FIG. 1, when unstable DC power, i.e., input voltage Vi is applied to the switching power source apparatus, the base current flows through transistor Q1 via resistors R1 and R2, and transistor Q1 is turned on. As a result, a voltage substantially equal to input voltage Vi is applied to both terminals of primary winding N11 of transformer M. Consequently, a voltage proportional to input voltage Vi is induced at base winding Nb of transformer M. Upon generation of this induced voltage, the base current flows through transistor Q1 via diode D1 and resistor R2, and transistor Q1 is set in a stable ON state. In this state, diode D3 is connected to secondary winding N12 so as to be reverse-biased with respect to the flowing direction of current Ii. Therefore, secondary current Io of transformer M is 0, and the collector current of transistor Q1 is equal to primary current Ii of transformer M.

Assume that transistor Q2 is turned on when transistor Q1 is in the ON state, and emitter voltage Vc of transistor Q5 is set at a high level, as shown in FIGS. 4B and 5B. When transistor Q2 is turned on, the base current of transistor Q1 is absorbed by the collector current of transistor Q2. As a result, transistor Q1 is turned off. When transistor Q1 is turned off, the energy stored in primary winding N11 of transformer M is transferred to secondary winding N12 and is then discharged. As a result, a counter electromotive force having a polarity opposite to that of the previously induced voltage is generated across secondary winding N12, and diode D3 is thereby rendered conductive. Consequently, secondary current Io flows through diode D3, and is then smoothed by capacitor C2. As a result, output voltage Vo is obtained. Similarly, a voltage is induced at control winding Nc of transformer M, and diode D2 is thereby rendered conductive. A current corresponding to secondary current Io flows through diode D2, for a period during which secondary current Io flows, i.e., for the energy discharge period of transformer M. When discharge of the energy stored in primary winding N11 of transformer M is completed, transistor Q1 is turned on again. Note that as shown in FIGS. 4B and 5B, when transistor Q2 is in the ON state because emitter voltage Vc of transistor Q5 is set at a high level, the base current of transistor Q1 is absorbed by the collector current of transistor Q2. For this reason, transistor Q1 is not turned on before transistor Q2 is turned off.

Output voltage Vo is applied to the series circuits of resistor R3 and Zener diode ZD, and of resistors R4 and R5. Amplifier AMP1 amplifies the difference between a Zener voltage (reference voltage) and a voltage across resistor R5. As a result, the output level of amplifier AMP1 is lowered with an increase in output voltage Vo, but raised with a decrease in output voltage Vo. Accordingly, amplifier AMP1 serves as a load detecting means when output voltage Vo increases and serves as output voltage detecting means when Vo decreases. Then, a current, corresponding to the difference between output voltage Vo and the output level of amplifier AMP1, flows through photodiode PD of photocoupler PC. Consequently, phototransistor Qp is turned on. The collector current of transistor Qp is increased and decreased in proportion to output voltage Vo. In other words, the collector voltage of transistor Qp is decreased as output voltage Vo is increased, and vice versa. The collector voltage of transistor Qp is 15 amplified up to voltage Va by amplifier AMP2. Accordingly, amplifier AMP2 also serves as a load detecting means when output voltage Vo increases and serves as an output voltage detecting means when Vo decreases.

Oscillator OSC generates sawtooth wave voltage Vb having a time constant determined by resistor R6 and capacitor C3. The period of sawtooth wave voltage Vb is altered in accordance with the operation of transistor Q3 to be described later, as shown in FIGS. 3A, 4A, and 5A. Sawtooth wave voltage Vb is applied to comparator CMP, together with output voltage Va supplied from amplifier AMP2. Comparator CMP compares voltage Va corresponding to output voltage Vo with sawtooth wave voltage Vb, and outputs a high-level output signal for only a period during which Va<Vb. When comparator CMP outputs the high-level output signal, both transistors Q4 and Q5 are turned on. When transistor Q4 is turned on, base voltage Vd of transistor Q3 becomes substantially 0 V. As a result, if transistor Q3 is in the ON state, it is turned off, and if in the OFF state, it is kept OFF. On the other hand, emitter voltage Vc is set at a high level when transistor Q5 is turned on, and hence transistor Q2 is turned on. When transistor Q2 is turned on, the base current of transistor Q1 is absorbed by the collector current of transistor Q2. As a result, transistor Q1 is turned off.

In contrast to the above case, when comparator CMP outputs a low-level output signal because Va≦Vb, both transistors Q4 and Q5 are turned off. When transistor Q4 is turned off, base voltage Vd of transistor Q3 is determined by the cathode voltage of diode D2. Diode D2 is rendered conductive for the energy discharge period of transformer M, i.e., within a period when secondary current Io is flowed. Consequently, as shown in FIGS. 3C and 4C, base voltage Vd of transistor Q3 is kept at a high level within a period when transistor Q4 is in the OFF state, or emitter voltage Vc of transistor Q5 is set at a low level while secondary current Io is flowed. When voltage Vd is set at a high level, transistor Q3 is turned on. When transistor Q3 is turned on, capacitor C3 cannot be charged because the both terminals thereof are set at the same potential. As a result, sawtooth wave voltage Vb is kept 0 for a period when transistor Q3 is turned on. The output of comparator CMP is set at a low level. Then, transistors Q4 and Q5 are turned off. When transistor Q5 is turned off, emitter voltage Vc is set at a low level, and transistor Q2 is turned off. When transistor Q2 is turned off, transistor Q1 is turned on.

Operations of the switching power source apparatus of the present invention will be described with respect to (A) the large load or power-on period, (B) the normal load period, and (C) the small load period which is directly related to the present invention.

(A) Large Load or Power-On Period

In the large load or power-on period, output voltage Vo is low. Since amplifier AMP2 outputs a high output voltage when output voltage Vo is low, voltage Va is set at a high level, as shown in FIG. 3A. In this state, voltage Va is higher than voltage Vb. Comparator CMP compares voltages Va and Vb, and outputs a high-level signal when Va>Vb. Therefore, in this case, comparator CMP outputs a low-level signal. Transistors Q4 and Q5 are kept in the OFF state.

Consequently, as shown in FIG. 3C, emitter voltage Vc of transistor Q5 is constantly kept at a low level. Transistor Q2 is kept in the OFF state. On the other hand, when the cathode of diode D2 is set at a high level, current Io flows, and thus voltage Vd is set at a high level. Then, transistor Q3 is turned on. Since both terminals of capacitor C3 are set at the same potential, capacitor C3 cannot be charged. As a result, sawtooth wave voltage Vb is kept 0 in the period when transistor Q3 is kept on. When energy discharge from transformer M is completed, and current Io is stopped, transistor Q2 is turned off. Transistor Q1 is then turned on, resulting in flow of current Ii. That is, in the large load period, currents Ii and Io alternately and continuously flow, as shown in FIGS. 3D and 3F. Therefore, in this case, the frequency modulation is equivalent to that in the conventional switching power source apparatus.

(B) Normal Load Period

In the normal load period, as shown in the timing chart of FIG. 4A, a time interval when voltage Va is lower than voltage Vb periodically appears. When Va<Vb, comparator CMP outputs a high-level signal. As a result, transistors Q5 and Q4 are turned on. Since emitter voltage Vc of transistor Q5 is set at a high level, transistor Q2 is turned on, and the base current of transistor Q1 is absorbed by the collector current of transistor Q2. Consequently, transistor Q1 is forcibly turned off. When transistor Q1 is turned off, current Ii is stopped, and transformer M starts discharging energy. When transformer M discharges energy, current Io flows. On the other hand, when Va>Vb, the output of comparator CMP is set at a low level. Then, transistors Q5 and Q4 are turned off. Since emitter voltage Vc of transistor Q5 is set at a low level, as shown in FIG. 4B, transistor Q2 is turned off. This state is kept for a period when Va≦Vb. Base voltage Vd of transistor Q3 is determined by the cathode voltage of diode D2. Diode D2 is kept conductive within the energy discharge period of transformer M, i.e., only the period when secondary current Io flows. Therefore, voltage Vd is set at a high level for the period when Va≦Vb is satisfied, and current Io flows, as shown in FIG. 4D. Since both terminals of capacitor C3 are short-circuited because transistor Q3 is turned on, sawtooth wave voltage Vb from oscillator OSC becomes 0. When transformer M finishes discharging energy, and current Io is stopped, no voltage is induced in control winding Nc of transformer M. As a result, diode D2 is rendered nonconductive, and the base current is not supplied to transistor Q2. Then, transistor Q1 is turned on, and current Ii flows. That is, as shown in FIGS. 4C and 4E, currents Io and Ii alternately and continuously flow in the normal load period. Therefore, in this case, the frequency modulation is equivalent to that in the conventional switching power source apparatus.

(C) Small Load Period

In the small load period, as shown in FIG. 5A, although a time interval when voltage Va is higher than voltage Vb periodically appears, it is very short. That is, in the small load period, the time interval when Va<Vb occupies the most of the cycle. In the time interval of Va<Vb, comparator CMP outputs a high-level signal as described above. As a result, transistors Q5 and Q4 are turned on. The emitter voltage Vc of transistor Q5 is set at a high level. Since the base current is supplied to transistor Q2, transistor Q2 is turned on. Consequently, the base current of transistor Q1 is absorbed by the collector current of transistor Q2. Transistor Q1 is forcibly turned off. As a result, as shown in FIG. 5E, current Ii does not flow. As is apparent from FIGS. 5B and 5E, transistor Q1 is kept in the OFF state until Va≦Vb and voltage Vc is set at a low level. That is, in the small load period, the ON period of transistor Q1 is very short. Therefore, currents Ii and Io flow for a short period of time.

As has been described above, when transistor Q1 is turned off, transformer M starts discharging energy. As a result, diode D3 is rendered conductive, and current Io flows, as shown in FIG. 5C. As shown in FIG. 5C, the period when current Io flows is short. In addition, in the period when current Io flows, the condition of Va≦Vb is not satisfied. Therefore, as shown in FIG. 5D, voltage Vd is not set at a high level. Since transistor Q3 is not turned on, sawtooth wave voltage Vb having a predetermined period with the time constant determined by capacitor C3 and resistor R6, as shown in FIG. 5A. Subsequently, when Va≦Vb, the output of comparator CMP is set at a low level. Then, transistors Q4 and Q5 are turned off. For this reason, as shown in FIG. 5B, emitter voltage Vc of transistor Q5 is set at a low level, as shown in FIG. 5B, and transistor Q2 is turned off. When transistor Q2 is turned off, transistor Q1 is turned on. As a result, current Ii flows, as shown in FIG. 5E.

What is claimed is:

1. A switching power source apparatus of a ringing choke converter system, comprising:
    a switching transistor;
    load detecting means for detecting that a load connected to said switching power source apparatus is either one of large and normal loads or a small load and outputting a detection signal; and
    sawtooth wave voltage generating means for generating a sawtooth wave voltage;
    means for increasing a duty ratio of said sawtooth wave voltage means when one of said large and normal loads is detected by said load detecting means; and
    means for turning off said switching transistor to decrease the duty ratio thereof when the small load is detected by said load detecting means.

2. A switching power source apparatus of a ringing choke converter system, comprising:
    a switching transistor;
    a transformer for storing energy during an ON period of said switching transistor, and discharging energy during an OFF period of said switching transistor;
    output voltage detecting means for detecting an output voltage from said switching power source apparatus, and for generating a detection voltage which decreases or increases as output voltage increases or decreases;
    sawtooth wave voltage generating means for generating a sawtooth wave voltage;
    comparing means for comparing the magnitudes of both the sawtooth wave voltage output from said sawtooth wave generating means and the detection output voltage;
    energy detecting means for detecting an energy discharge period of said transformer;
    a first control transistor, which is turned on for a period during which said comparing means detects that the sawtooth wave voltage is lower than the detection output voltage in the energy discharge period of said transformer, and which causes said sawtooth wave voltage generating means to delay generation of the sawtooth wave voltage;
    a second control transistor, which is turned on for a period during which said comparing means detects that the sawtooth wave voltage is higher than the detection output voltage and which turns off said switching transistor; and
    means for preventing said first control transistor from being turned on when a load connected to said switching power source apparatus is small.

* * * * *